UNITED STATES PATENT OFFICE.

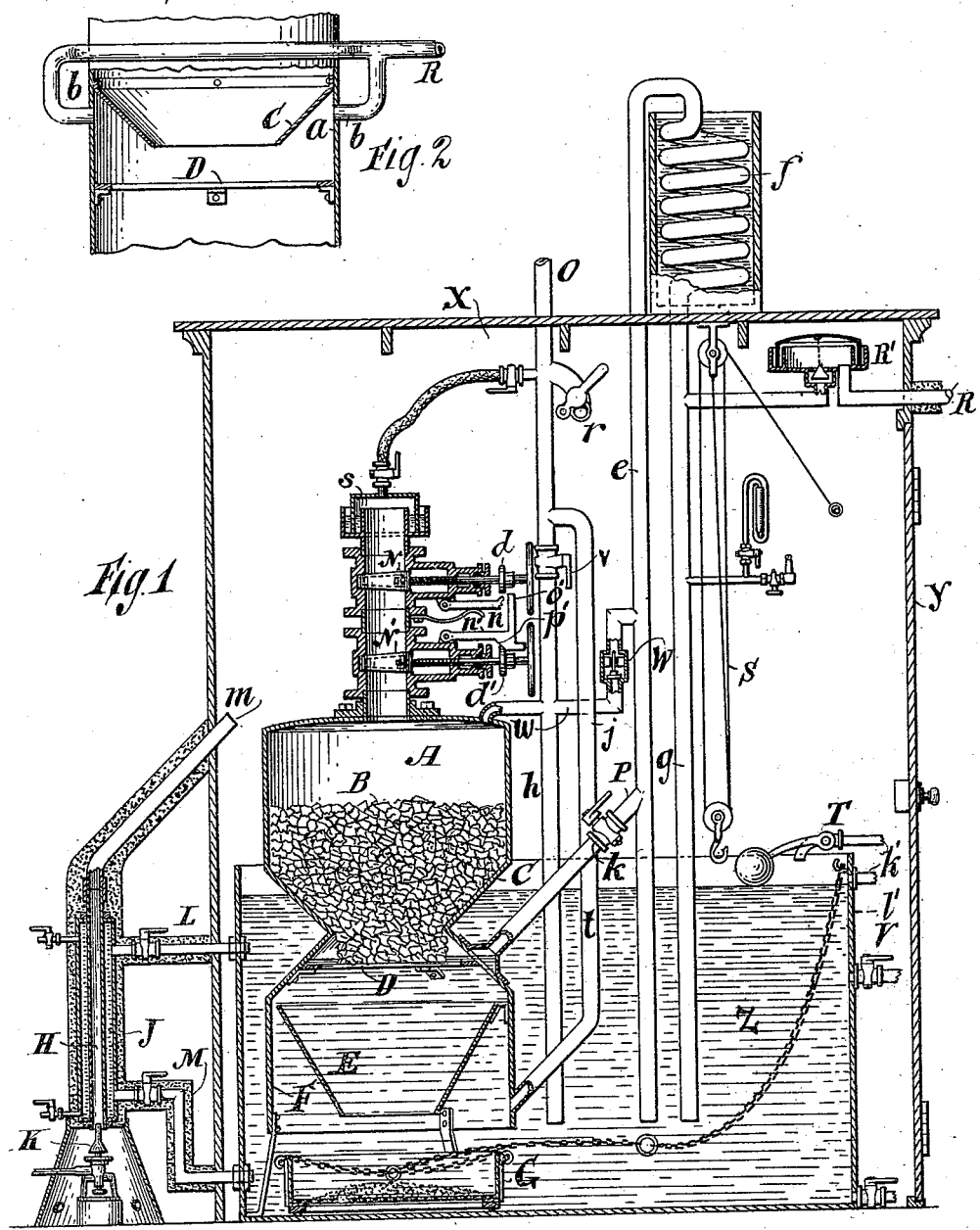

EDWARD N. DICKERSON, OF NEW YORK, N. Y.

APPARATUS FOR PRODUCING GAS.

SPECIFICATION forming part of Letters Patent No. 553,781, dated January 28, 1896.

Application filed May 1, 1895. Serial No. 547,752. (No model.)

*To all whom it may concern:*

Be it known that I, EDWARD N. DICKERSON, of the city, county, and State of New York, have invented a new and useful Improvement in Apparatus for Producing Gas, of which the following is a full, true, and exact description, reference being had to the accompanying drawings.

This invention relates to an improved detail of construction upon the apparatus for which I have obtained Letters Patent of the United States No. 541,429, granted June 18, 1895, and it is especially designed to prevent the freezing of the apparatus in cold weather, while at the same time safety from an explosion is insured, and it is so constructed as to allow of the ready and certain feeding of the apparatus without exposure to the atmosphere and the ready and certain removal of the refuse material from the generator. In the form shown the whole apparatus is inclosed in a suitably-ventilated chamber. There is also a modification in the structure, enabling the same result as that previously indicated to be accomplished by a somewhat simpler mechanism.

My invention will be readily understood from the accompanying drawings, in which—

Figure 1 represents an elevation, partly in cross-section, of my apparatus complete; and Fig. 2 a modification of the structure of the feeding-cone and the surrounding parts, generally in vertical cross-section.

A represents a suitable receiver for containing the calcium carbide, which material I use by way of illustration. This chamber has a contracted lower delivery-opening, as at the bottom of the cone C, below which is the grate D, upon which the material falls in such way as not completely to fill the again expanding portion of the generator, which, as will be readily seen, is practically hour-glass in shape.

The lower chamber, F, should be made of suitable area, so as to contain any excess of generated gas. A suspended conical guide E is placed in the chamber F, and, 'since the action of the water on calcium carbide precipitates lime, such lime will fall through the guiding-chamber E into the tray G, and it then can be drawn out beneath the water in the apparatus by means of the chain shown, and then raised by the tackle S, and so swung out of the apparatus.

The water-tank Z, automatically fed to a proper height, as at $l$, by the float-cock T, surrounds the generator A, and also serves as a seal to the various pipes dipping into it.

The chamber A is fed through the valves N N', which are opened by screwing out the hand-wheels shown, but these wheels are so arranged that only one can be screwed out at once—that is, only one of the valves N N' can be simultaneously opened. This device can be arranged in many ways. In the form shown collars $d$ $d'$ are placed upon the valve-stems. Corresponding locking-levers $n$ $n'$, suitably pivoted, work in co-operation with these collars. The lever $n'$, for instance, has the angular surface $p'$ and the upper projection or arm $o'$. As soon as the lower hand-wheel is unscrewed the collar $d$, engaging with the angular projection $p'$, raises the arm $o'$, which thereupon locks the collar $d$, and the apparatus is so arranged that the arm $o'$ will continue raised to the full extent of the movement of the valve. A similar arm and locking device is operated by the upper valve. In this case it is held in its normal position by a spring. The upper end of the feeding-tube may be closed by a cap $s$ supported upon a flexible tube connected with a ventilating-pipe O. This ventilating-pipe O also serves to ventilate the room X, which is provided with door Y, in which the whole apparatus may be placed. The ventilating-valve $r$ is ordinarily left open and carries off any escaping gases in the room.

At about the level of the grate is placed the gas-escape pipe P, provided with a cock $k$. This opens into the pipe $e$, which dips below the surface of the water to about the lower level of the chamber F. This pipe $e$ may pass through a condensing-chamber $f$, whence the condensed water, if any, will fall again through the pipe $g$ into the water of the receiver. The gas passes off by the service-pipe R. A pipe $h$ is also provided, connecting with the upper part of the chamber A. In this is provided a check-valve W opening into the pipe $e$. This pipe also connects through valve $v$ with ventilating-pipe O.

The entire chamber X and the water may be readily warmed, as follows: K represents a burner, preferably a Bunsen burner, which may be fed from the generated gas. The products of combustion from this burner pass upward through the pipe H, which opens into the pipe $m$ delivering into the chamber. Surrounding the pipe H is the concentric pipe J, which connects by the pipes L M with the upper and lower portions of the water in the tank Z. In this way a circulation of warm water is maintained and the room is kept warm.

Instead of the structure shown in Fig. 1 the outside casing of the chamber A may be cylindrical, and the chamber will then deliver as before into the interior cone C, Fig. 2, around which is the chamber $a$ serving for the outlet of gas by means of outlets $b\ b$, connecting with delivery-pipe R. The operation will be plainly the same as in the other device heretofore referred to.

The operation of this device can now be readily understood. By opening the valve V the water-level is lowered below the grate D. Then by removing the cap $s$ and closing the ventilator $r$ the material will be readily fed by means of a funnel through the valves N N', alternately opening into the chamber A. Of course a single valve may be employed if desired, but by the means shown there is no possibility of escape of any gas to the room. The desired amount of carbide B being delivered to the chamber A, the valve V is closed and the water-level raised until the water comes in contact with the carbide B. Then by opening the valve $v$ the apparatus can be purged of any contained air, if desired, by allowing the pressure of the gas to force the contained air or mingled air and gas to escape through the escape-pipe O, though if a double valve is used there should be no contained air after the first operation. Then, closing the valve $v$ and replacing the cap $s$ and opening the ventilator $r$, the apparatus will supply gas automatically until the carbide B is exhausted, since by providing a regulating-valve R' of any suitable construction in the delivery-pipe R only the desired pressure will go to the house, whereas an excess of pressure in the chamber A will force down the water below the grate D and the generation will practically stop. Any excess of generated gas will be received in the lower chamber F. If by any chance this excess of gas should fill the chamber F to the point of opening of the pipe $t$, then such excess of gas would pass by the pipe $t$ and the pipe O to the air.

Any deposited moisture in any of the pipes in the apparatus will, as will be readily seen, fall into the water in the tank Z. Any deposited lime falling in the tray G can be removed at intervals, as desired, and withdrawn from the apparatus. In cold weather, the door Y being closed and the burner K lighted, both the water in the tank Z is warmed and also the air within the chamber X, while at the same time, the products of combustion passing constantly upward through the pipe $m$, there is no possibility of exploding any explosive mixture in the chamber X should any exist there. In case of a leakage in the chamber X if there were a flame there an explosion might occur.

If at any time there should be a stoppage in the neck of the hour-glass so as to make a practically gas-tight joint there, if it were not for the pipe $w$ an excess of pressure might be generated in the chamber A, bursting the same; but the pipe $w$, provided with check-valve W, allows any escape of such excessive pressure into the pipe $e$, while, at the same time, under normal conditions, all the gas escapes through the pipe $k$ instead of the pipe $w$, because the weight of the check-valve W makes sufficient difference in pressure to force the gas to follow the pipe $k$, which is desirable, as otherwise the generated gas containing some water passes through the material B, and thereby has a tendency to generate an excess of gas.

It is apparent that parts of this device may be used without other parts. The condenser $f$ is ordinarily non-essential; but if the gas through pipe R has to pass through any cold space it is desirable to employ the condenser to prevent freezing of any excess of moisture in such pipe. It is obvious, also, that though I have shown the burner K as a Bunsen burner another source of heat could be employed.

It is an advantage to lower the level of the water in charging the apparatus only a short way beneath the grate D, since the water absorbs a certain amount of gas, and in charging the apparatus with additional water the waste water carries off a percentage of the gas.

The overflow $k'$ is desirable as preventing any unnecessary excess of pressure in the apparatus, since if the water is forced down in the chamber F it never can be raised above the level of the overflow $k'$. The normal level at which water is fed through the cock T should be below the level of the overflow $k'$, say approximately at $l'$.

When in this specification I refer to the grating D, I of course refer to any suitable perforated support for the carbide B.

What I claim as my invention, and desire to secure by Letters Patent, is—

1. The combination in an apparatus for supplying gas by the union of a solid and a liquid, of a chamber for containing the solid material above a grate, a grate or perforated support for supporting said material above the chamber containing water, an escape-pipe for carrying off the generated gas located at or about the level of the grate, and a pipe communicating with the upper part of the chamber and with said escape-pipe and containing a check-valve opening from the upper chamber toward the escape-pipe, substantially as described.

2. The combination in an apparatus for generating gas by the union of a solid and liquid, of a chamber A for containing the solid material, and the grating D supporting the same, the lower chamber F containing the liquid beneath the grating D, and itself contained in the liquid-receptacle Z, its lower opening being located above the bottom of said receptacle, the removable tray G, and the interior cone E for guiding the refuse material into the tray G, substantially as described.

3. In a gas-generating apparatus, the combination of the gas-generator A, surrounded by the liquid-receptacle Z contained in the chamber X, and a heating contrivance consisting of an exterior combustion-chamber delivering its products of combustion into the chamber X, substantially as described.

4. In a gas-generating apparatus, the combination of the gas-generator A, surrounded by the liquid-receptacle Z contained in the chamber X, and a heating contrivance consisting of an exterior combustion-chamber delivering its products of combustion into the chamber X, the said exterior heating-chamber being provided with a water-heater having two connections at different levels to the water within the chamber, thereby simultaneously heating the water and the air within the chamber, substantially as described.

5. In an apparatus for producing gas by the union of a liquid and a solid, the combination of an exterior cylindrical chamber $a$, an interior cone $c$ and the grating D, and the gas-outlet $b$ located in the space between the cylindrical chamber $a$ and the cone $c$, substantially as described.

6. The combination in a gas-generating apparatus, of the chamber A, the grating D, the chamber F, the interior guiding-cone E, and the removable receptacle G, substantially as described.

In testimony whereof I have signed my name to this specification in the presence of two subscribing witnesses.

E. N. DICKERSON.

Witnesses:
H. CONTANT,
ANTHONY GREF.